United States Patent
Pan et al.

(10) Patent No.: US 12,328,745 B2
(45) Date of Patent: Jun. 10, 2025

(54) SYSTEM AND METHOD FOR BLIND DETECTION

(71) Applicant: ZTE CORPORATION, Guangdong (CN)

(72) Inventors: Yu Pan, Shenzhen (CN); Chuangxin Jiang, Shenzhen (CN); Shujuan Zhang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 112 days.

(21) Appl. No.: 18/334,210

(22) Filed: Jun. 13, 2023

(65) Prior Publication Data
US 2023/0371043 A1 Nov. 16, 2023

Related U.S. Application Data

(63) Continuation of application No. PCT/CN2020/136088, filed on Dec. 14, 2020.

(51) Int. Cl.
*H04W 72/232* (2023.01)
*H04L 1/00* (2006.01)
(Continued)

(52) U.S. Cl.
CPC ......... *H04W 72/232* (2023.01); *H04L 1/0046* (2013.01); *H04L 1/0072* (2013.01);
(Continued)

(58) Field of Classification Search
CPC ..... H04W 72/232; H04W 72/23; H04W 8/22; H04W 72/0446; H04W 72/1268;
(Continued)

(56) References Cited

U.S. PATENT DOCUMENTS

| 12,063,673 B2 * | 8/2024 | Khoshnevisan | ...... H04W 72/23 |
| 2010/0254268 A1 * | 10/2010 | Kim | ........................ H04L 5/001 370/328 |

(Continued)

FOREIGN PATENT DOCUMENTS

| CN | 110166203 A | 8/2019 |
| CN | 111587555 A | 8/2020 |

(Continued)

OTHER PUBLICATIONS

Extended European Search Report for EP App. No. 20965332.8 dated Feb. 7, 2024 (9 pages).

(Continued)

*Primary Examiner* — Meng Vang
*Assistant Examiner* — Ayodele Lawrence Olubodun
(74) *Attorney, Agent, or Firm* — Foley & Lardner LLP (57) ABSTRACT

A system and method for wireless communication are disclosed herein. Example implementations includes a wireless communication device determining one or more counters for a plurality of linked PDCCH (Physic Downlink Control Channel) candidates, wherein the plurality of linked PDCCH candidates are linked. The one or more counters are numbers of linked PDCCH candidates to be monitored, where each counter is an integer or a decimal. The counters may count individual candidates and/or combined candidates. The counters counting the PDCCH candidates may be the same number of different numbers. The wireless communication device may blindly determine downlink information using the counters and the linked PDCCH candidates.

8 Claims, 6 Drawing Sheets

(51) Int. Cl.
H04L 5/00 (2006.01)
H04W 8/22 (2009.01)
H04W 72/0446 (2023.01)
H04W 72/1268 (2023.01)
H04W 72/1273 (2023.01)
H04W 72/23 (2023.01)

(52) U.S. Cl.
CPC .......... H04L 5/0044 (2013.01); H04L 5/0051 (2013.01); H04L 5/0053 (2013.01); H04W 8/22 (2013.01); H04W 72/0446 (2013.01); H04W 72/1268 (2013.01); H04W 72/1273 (2013.01); H04W 72/23 (2023.01)

(58) Field of Classification Search
CPC ............. H04W 72/1273; H04L 5/0051; H04L 1/0046; H04L 5/0053; H04L 1/0072; H04L 5/0044
See application file for complete search history.

(56) References Cited

U.S. PATENT DOCUMENTS

| | | | |
|---|---|---|---|
| 2020/0351896 A1* | 11/2020 | Taherzadeh Boroujeni | H04L 5/0091 |
| 2023/0388058 A1* | 11/2023 | Gao | H04L 5/0055 |
| 2024/0023132 A1* | 1/2024 | Zhang | H04L 5/0094 |

FOREIGN PATENT DOCUMENTS

| | | |
|---|---|---|
| EP | 3 684 126 A1 | 7/2020 |
| WO | WO-2019/139955 A1 | 7/2019 |

OTHER PUBLICATIONS

Samsung, "Enhancements on Multi-TRP for PDCCH, PUCCH and PUSCH," 3GPP TSG RAN WG1 #103-e, R1-2008149, e-Meeting, Oct. 26-Nov. 13, 2020 (11 pages).

AD-HOC Chair (Samsung), "Session notes for 8.1 (Further enhancements on MIMO for NR)", 3GPP TSG RAN WG1 Meeting #103-e, R1-2009832, Nov. 13, 2020, e-Meeting (17 pages).

Fraunhofer Iis et al., "On multi-TRP enhancements for PDCCH and PUSCH", 3GPP TSG RAN WG1 Meeting #103-e, R1-2008898, Nov. 13, 2020, e-Meeting (9 pages).

Huawei et al., "Enhancements on Multi-TRP for reliability and robustness in Rel-17", 3GPP TSG RAN WG1 Meeting #102-e, R1-2006391, Aug. 28, 2020, e-Meeting (7 pages).

Huawei et al., "Enhancements on multi-TRP for reliability and robustness in Rel-17", 3GPP TSG RAN WG1 Meeting #103-e, R1-2007587, Nov. 13, 2020, e-Meeting (12 pages).

Moderator (Qualcomm), "Summary #2 of email discussions [103-e-NR-feMIMO-02] for mTRP PDCCH enhancements", 3GPP TSG-RAN WG1 Meeting #103-e, R1-2009761, Nov. 13, 2020, e-Meeting (12 pages).

Moderator (Qualcomm), "Summary of email discussions [103-e-NR-feMIMO-02] for mTRP PDCCH enhancements", 3GPP TSG-RAN WG1 Meeting #103-e, R1-2009683, Nov. 13, 2020, e-Meeting (73 pages).

NEC, "Discussion on multi-TRP for PDCCH, PUCCH and PUSCH", 3GPP TSG RAN WG1 #103-e, R1-2008944, Nov. 13, 2020, e-Meeting (3 pages).

Qualcomm Incorporated, "Summary #2 of email discussion [102-e-NR-feMIMO-02]" 3GPP TSG RAN WG1 Meeting #102-e, R1-2007181, Aug. 28, 2020, e-Meeting (13 pages).

Spreadtrum Communications, "Discussion on enhancements on Multi-TRP for PDCCH, PUCCH and PUSCH", 3GPP TSG RAN WG1 #103-e, R1-2009142, Nov. 13, 2020, e-Meeting (13 pages).

VIVO: "Further discussion on enhancement of MTRP operation" 3GPP TSG RAN WG1 #103-e; R1-2007645; Nov. 13, 2020; e-Meeting (15 pages).

CATT: "Discussion on enhancements on multi-TRP/panel for PDCCH, PUCCH and PUSCH" 3GPP TSG RAN WG1 Meeting #103-e; R1-2007825; Nov. 13, 2020; e-Meeting (15 pages).

International Search Report and Written Opinion for PCT Appl. No. PCT/CN2020/136088, mailed Sep. 13, 2021 (8 pages).

ZTE: "Multi-TRP enhancements for PDCCH, PUCCH and PUSCH" 3GPP TSG RAN WG1 Meeting #103-e; R1-2007764; Nov. 13, 2020; e-Meeting (22 pages).

* cited by examiner

SYSTEM AND METHOD FOR BLIND DETECTION

CROSS-REFERENCE TO RELATED APPLICATION

This application claims the benefit of priority under 35 U.S.C. § 120 as a continuation of PCT Patent Application No. PCT/CN2020/136088, filed on Dec. 14, 2020, the disclosure of which is incorporated herein by reference in its entirety.

TECHNICAL FIELD

The disclosure relates generally to wireless communications and, more particularly, to systems and methods for blind detection.

BACKGROUND

Joint transmission or reception is the transmission or reception of multiple signals from multiple sites transmitted or received at the same time. Joint transmission or reception of Multiple Transmission and Reception Point (Multi-TRP) plays a significant role in increasing the throughput of wireless communication. Both Long Term Evolution-Advanced (LTE-A) and New Radio Access Technology (NR) support multi-transmission receiving node transmission.

SUMMARY

The example implementations disclosed herein are directed to solving the issues relating to one or more of the problems presented in the prior art, as well as providing additional features that will become readily apparent by reference to the following detailed description when taken in conjunction with the accompany drawings. In accordance with various implementations, example systems, methods, devices and computer program products are disclosed herein. It is understood, however, that these implementations are presented by way of example and are not limiting, and it will be apparent to those of ordinary skill in the art who read the present disclosure that various modifications to the disclosed implementations can be made while remaining within the scope of this disclosure.

In one implementation, a method performed by a wireless communication device includes determining one or more counters for a plurality of linked PDCCH (Physic Downlink Control Channel) candidates, wherein the plurality of linked PDCCH candidates are linked, and wherein the one or more counters are numbers of linked PDCCH candidate to be monitored, and each of the one or more counters is an integer or a decimal, the one or more counters are counted as a same number or different numbers; and detecting downlink information using the plurality of linked PDCCH candidates and the one or more counters.

In another implementation, a method performed by a wireless communication device includes determining the one or more counters for the plurality of linked PDCCH candidates, the method comprises determining one counter for the plurality of linked PDCCH candidates; and the one counter is split into two or more counters, each counter of the two or more counters corresponds to each of the plurality of linked PDCCH candidates.

The above and other aspects and their implementations are described in greater detail in the drawings, the descriptions, and the claims.

BRIEF DESCRIPTION OF THE DRAWINGS

Various example implementations of the present solution are described in detail below with reference to the following figures or drawings. The drawings are provided for purposes of illustration only and merely depict example implementations of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE IMPLEMENTATIONS

Various example implementations of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example implementations and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
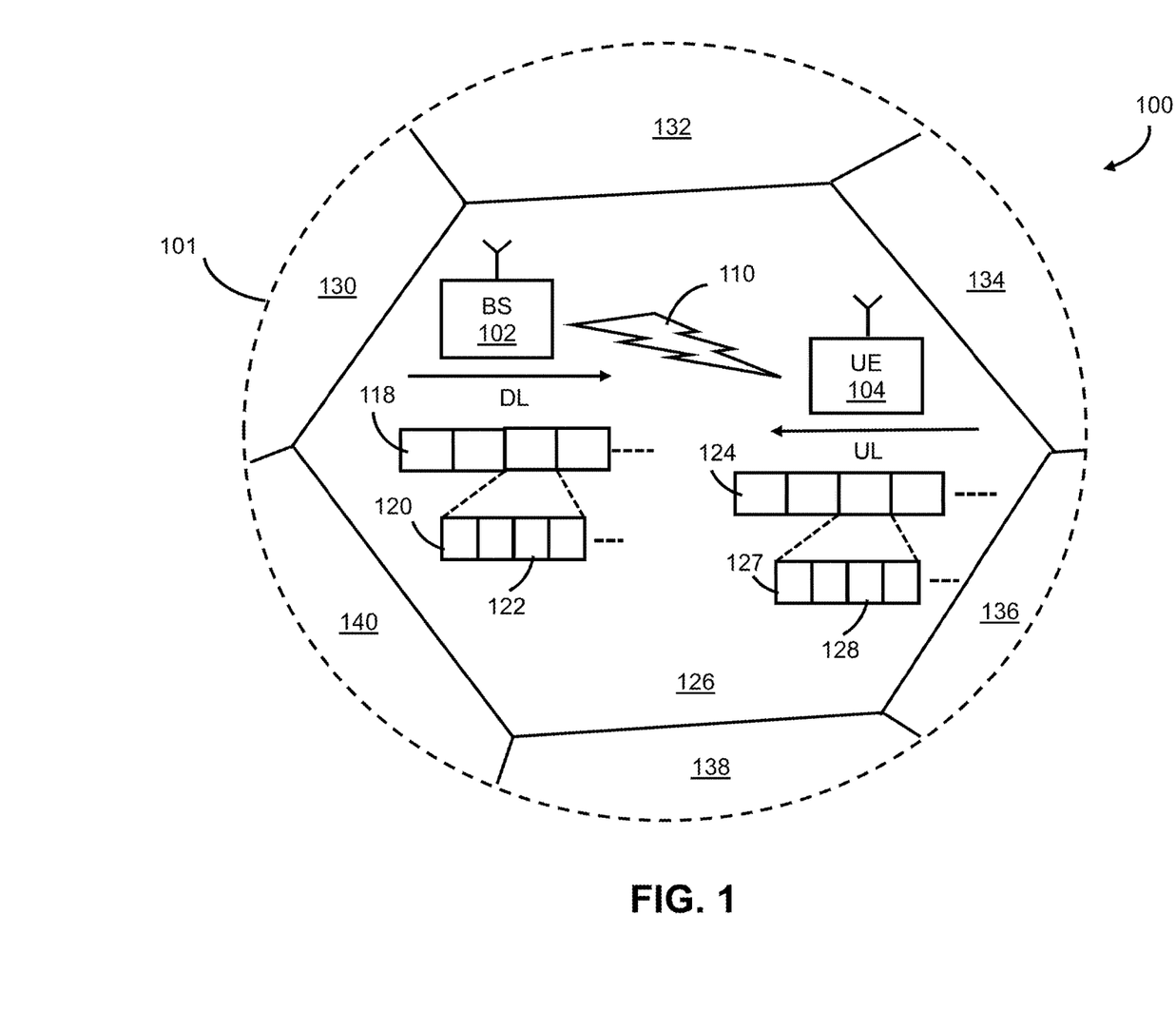
FIG. 1 illustrates an example cellular communication network in which techniques and other aspects disclosed herein may be implemented, in accordance with an implementation of the present disclosure.

FIG. 1 illustrates an example wireless communication network, and/or system, 100 in which techniques disclosed herein may be implemented, in accordance with an implementation of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various implementations of the present solution.

Figure 2:
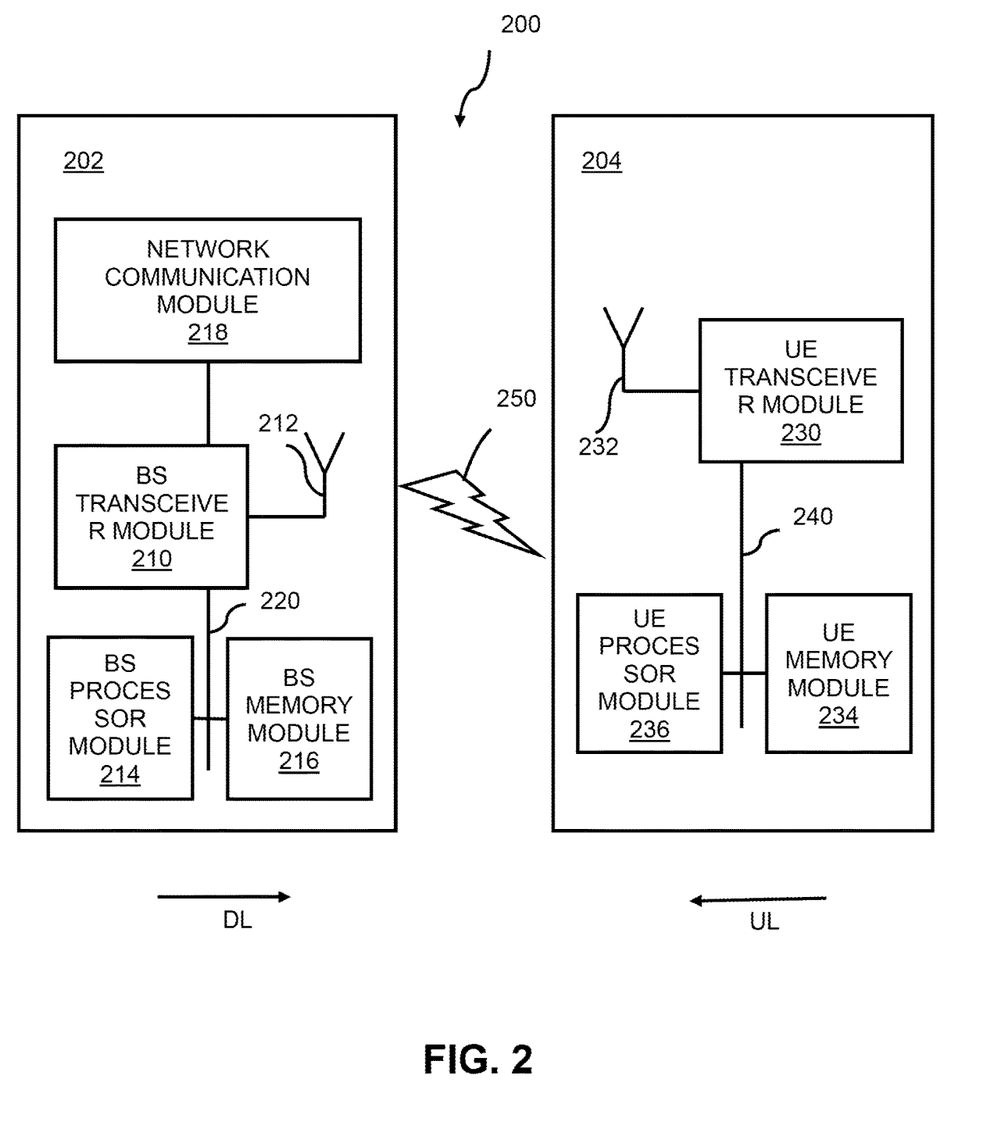
FIG. 2 illustrates block diagrams of an example base station and a user equipment device, in accordance with some implementations of the present disclosure.

FIG. 2 illustrates a block diagram of an example wireless communication system 200 for transmitting and receiving wireless communication signals, e.g., OFDM/OFDMA signals, in accordance with some implementations of the present solution. The system 200 may include components and elements configured to support known or conventional operating features that need not be described in detail herein. In one illustrative implementation, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the implementations disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some implementations, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some implementations, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some implementations, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative implementations, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various implementations, the BS 202 may be an evolved node B (eNB), a serving eNB, a target eNB, a femto station, or a pico station, for example. In some implementations, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the implementations disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some implementations, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

A UE receives scheduling information according to downlink control information (DCI). The Physical Downlink Control Channel (PDCCH) is the physical channel that carries the DCI information. Multiple PDCCHs may be transmitted in a single duration of time for various user equipment (UE). When a UE receives a PDCCH transmission, the UE may deinterleave, decode, combine symbols, demodulate symbols, descramble, and the like, the received PDCCH transmission, resulting in one or more PDCCH payloads. The PDCCH payload, which may be further coded, may indicate the control channel elements (CCEs) available for use by the UE. The CCEs for the UE may indicate resource elements (REs) for the UE. The UE may not be aware of the transformations undergone by the PDCCH payload, leaving the UE to blindly decode the PDCCH payload. In the event that the UE successfully decodes the PDCCH payload, the UE may determine that the PDCCH carries the UE's own control information.

Multiple PDCCHs may be transmitted that may or may not be relevant to the particular UE. A particular UE may search for relevant PDCCHs by searching for PDCCH candidates in a search space (SS). The SS set may include possible locations for the PDCCH. The SS set indicates a set of CCE locations where the UE may find PDCCHs. The UE may monitor PDCCH candidates periodically for a duration of time (e.g., a slot or span) and count the number of PDCCH candidates in the duration of time to blindly detect the DCI information for the particular UE. The number of PDCCH candidates counted/monitored may be zero, a positive value, an integer, or a decimal. Additionally or alternatively, control resource sets (CORESETs) may be used to convey control information in NR. For example, a UE may be configured for PDCCH repetition with two different CORESETs, where the CORESETs may have different parameters.

Further, the UE may determine scheduling information for Physical Downlink Shared Channel (PDSCH) transmissions from a portion of control information from linked control information. The linked control information may include linked PDCCH candidates, linked CORESETs, linked SS sets, linked monitoring occasions (MOs), linked DCI transmissions, or linked PDCCH transmissions. The linked control information may also include two linked PDCCH candidates and a time offset between one of the two of the linked PDCCH candidates and a scheduled PDSCH/PUSCH is larger than a processing time of the PDSCH/PUSCH. The time offset may be a minimum time interval between the last symbol of one of the two of the linked PDCCH candidates and the first symbol of a schedule PDSCH/PUSCH. The linked control information may also include two linked DCI transmission and a time offset between a later DCI transmission of the two of the DCI transmissions and a scheduled PDSCH/PUSCH transmission is larger than or equal to a minimum scheduling offset restriction. The tie offset may be a minimum time interval between the last symbol of one of the two of the linked PDCCH candidates and the first symbol of a scheduled PDSCH/PUSCH.

In the event that the scheduling of linked PDCCH is configured, the scheduling information of the PDSCH may be determined according to one of the PDCCH transmissions. The PDCCH transmission may be monitored in one of the two CORESETs/SS set, and linked PDCCH candidates. A portion of the control information of the linked control information may include a CORESET with a lowest/highest CORESETPoolIndex parameter, a CORESET with a largest/smallest CORESET ID, a SS set with a largest/smallest SS set ID, a CORSET/SS set/PDCCH candidate in which one repetition of the PDCCH is monitored earlier in time (first), and a CORSET/SS set/PDCCH candidate in which one repetition of the PDCCH is monitored later in time (second).

The scheduling information may include one or more REs not available for PDSCH transmission, a reference signal (RS) quasi co-located with Demodulation Reference Signal (DM-RS) ports of PDSCH transmission, and/or a PDSCH scrambling sequence.

For example, the UE may determine the REs declared as not available for PDSCH according to the indication in the CORESET with the lowest CORESETPoolIndex. The UE may also determine the RS quasi co-located with the DM-RS ports of PDSCH transmission according to the indication in the CORESET with the lowest CORESETPoolIndex if the offset between the reception of the DCI and the corresponding PDSCH is less than the threshold timeDurationForQCL. The UE may also determine the PDSCH scrambling sequence according to the indication in the CORESET with the lowest CORESETPoolIndex.

The BS may link PDCCH candidates in advanced. That is, several PDCCH candidates may be configured to have a relationship, the DCIs detected in the PDCCH candidates schedule the same Physical Downlink Shared Channel (PDSCH), Physical Uplink Shared Channel (PUSCH), sounding reference signal (SRS), the channel state information reference signal (CSI-RS), or the DCIs detected in the PDCCH candidates have the same payload.

In the event that two linked PDCCH candidates are not received in a time duration (e.g., one slot), and two DCIs monitored in the two linked PDCCH candidates schedule a same PDSCH transmission (or SRS transmission, PUSCH transmission, Physical Uplink Control Channel (PUCCH) transmission, or CSI-RS transmission), then the UE may assume the time interval between the earlier DCI and the PDSCH according to the Time Domain Resource Assignment (TDRA) field in the earlier DCI. The UE may determine the slot offset between the later DCI and a scheduled PDSCH or PUSCH by subtracting a slot offset indicated in the TDRA field in the later DCI from the slot offset of the two linked PDCCH candidates.

Additionally or alternatively, in the event that two linked PDCCH candidates are not received in a time duration (e.g., one slot), and two DCIs monitored in the two linked PDCCH candidates schedule a same PDSCH transmission (or SRS transmission, PUSCH transmission, Physical Uplink Control Channel (PUCCH) transmission, or CSI-RS transmission), then the UE may assume the time interval between the later DCI and the PDSCH according to the TDRA field in the later DCI. The UE may determine the slot offset between the earlier DCI and the scheduled PDSCH or PUSCH by adding a slot offset indicated in the TDRA field in the earlier DCI and the slot offset value of the two linked PDCCH candidates/DCIs.

For example, in the event that: (1) the slot offset between the two linked PDCCH candidates is one slot, (2) two linked PDCCH candidates schedule 1 PDSCH, and (3) the KO value is two in both the earlier DCI and the later DCI, then the slot offset between the earlier DCI and the PDSCH is two, and the slot offset between the later DCI and the PDSCH is one slot (e.g., 2 slots−1 slot). The KO value may be configured in Radio Resource Control (RRC) or DCI.

In the event that two PDCCH candidates are linked (or there is other linked control information), then the minimum time interval between the last symbol of one of the linked PDCCH candidates and the first symbol of the scheduled PDSCH/PUSCH transmission may be larger than the processing time of the PDSCH/PUSCH transmission. For example, in the event that two linked PDCCH candidates are in different time durations (e.g., different slots), the time interval between the later DCI and the PDSCH/PUSCH repetition is the minimum time interval. Thus, the time interval may be larger than the processing time of the PDSCH transmission.

In the event that (1) two PDCCH candidates are linked (or there is other linked control information) and (2) the UE is configured with minimumSchedulingOffsetKO or minimumSchedulingOffsetK2, or when the minimum scheduling offset restriction is applied, then the slot offset between the later DCI and the PDSCH/PUSCH transmission may be greater than or equal to $$\left\lceil K_{0min} \cdot \frac{2^{\mu'}}{2^{\mu}} \right\rceil \text{ or } \left\lceil K_{2min} \cdot \frac{2^{\mu'}}{2^{\mu}} \right\rceil,$$

respectively, where $K_{0min}$ is configured in RRC or DCI, and $\mu'$ is the numerology of the new active DL bandwidth part (BWP) in the event that the active DL BWP changes in the scheduled cell by an amount $\mu$. The minimum scheduling offset restriction may be configured by RRC or DCI.

In the event two PDCCH candidates are linked (or there is other linked control information), and the PDCCH candidates are not overlapped, the UE may determine the Downlink Assignment Index (DAI) value in a later DCI according to the earlier DCI. The PDCCH candidates are not overlapped in the event that the start or end symbol of two MOs of two PDCCH candidates are not the same.

In the event that two PDCCH candidates are linked (or there is other linked control information), and the UE decodes the individual PDCCH candidates, then the content in the two DCIs monitored in the two PDCCH candidates may be different. That is, the time indication of the PDSCH/PUSCH may be different, or the DAI may be different.

Figure 3:
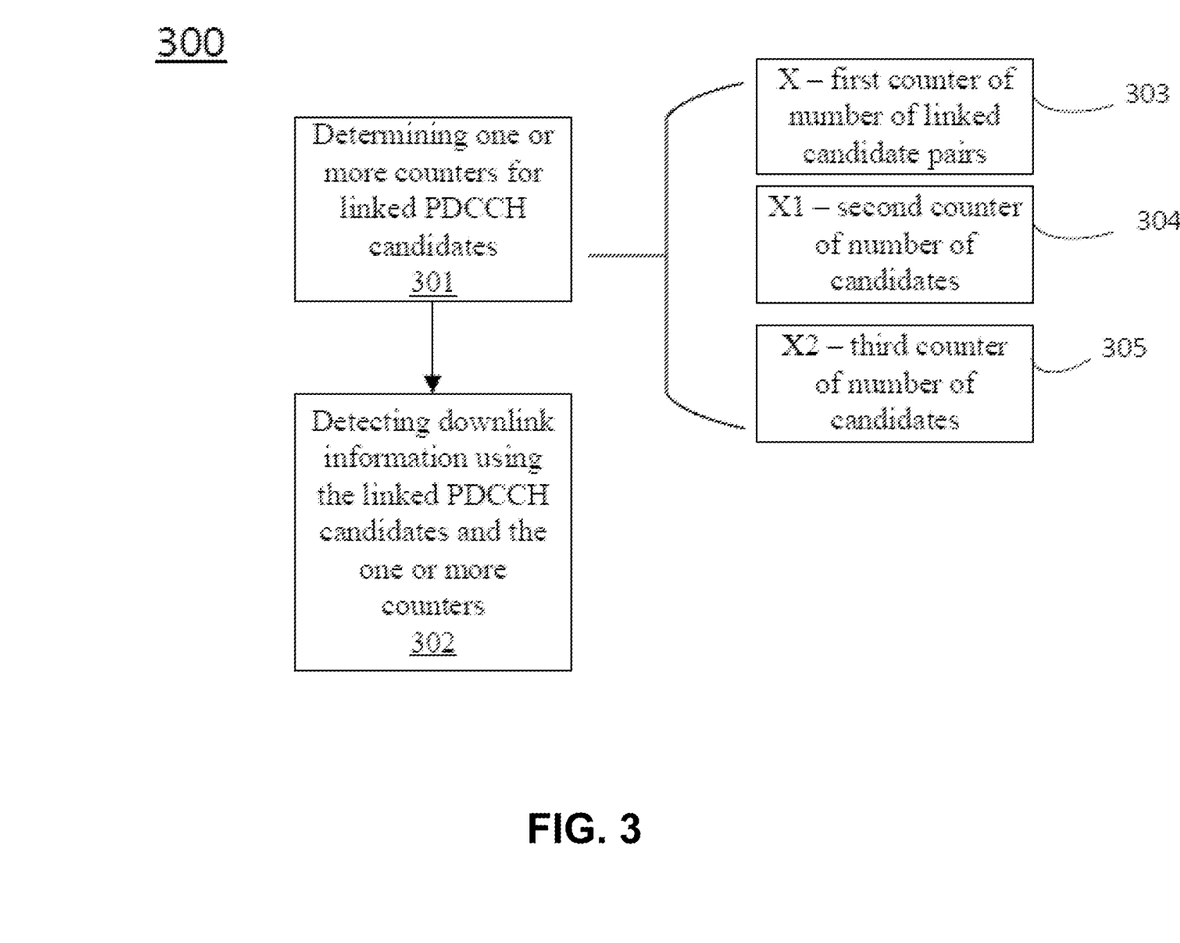
FIG. 3 illustrates an example method of detecting downlink information from PDCCH candidates, in accordance with some implementations of the present disclosure.

FIG. 3 illustrates an example method of detecting downlink information from PDCCH candidates, in accordance with some implementations of the present disclosure. In some embodiments, based on periodic monitoring, the UE may use one or more counters to count/assume a same number of linked PDCCH candidates in a duration of time. In alternate embodiments, the UE may use one or more counters to count/assume a different number of linked PDCCH candidates in the duration of time. The counters may be integers or decimals. In the event the UE successfully decodes the PDCCH candidates, the UE determines that the PDCCH carries the UE's control information. The UE control information being accessible to the UE based on the decoded PDCCH candidate.

At 301, the UE may determine one or more counters for one or more linked PDCCH candidates. One counter X, may be a counter of a number of linked candidate pairs (303), one counter X1 may be a second counter of a number of candidates (304) and one counter X2 may be a third counter of a number of candidates (305).

The UE may determine various counters for the linked PDCCH candidates, where each of the counters count one linked PDCCH candidate. The UE may also determine one counter for the linked PDCCH candidates. The UE may split the one counter into two or more counters where each counter corresponds to a linked PDCCH candidate. Additionally or alternatively, the UE may determine that one counter counts each linked PDCCH candidate.

For example, the BS may have linked or associated two candidates, a first candidate in a first time duration (e.g., slot m, span m, and so on), and a second candidate in a second time duration (e.g., slot n, span n, and so on). The first candidate may be considered candidate x, and the second candidate may be considered candidate y. Candidate x may be part of a SS set indexed by p, and candidate y may be part of a SS set indexed by q.

A UE may monitor a first PDCCH candidate by counting/assuming, using the first counter (303) that may be split into two or more counters (304, 305), the number of candidates x in SS set p in the first time duration (e.g., slot m, span m, and so on) as X1, where X1 is the second counter 304 defined by a positive value or zero.

The UE may monitor a second PDCCH candidate by counting/assuming, using the first counter (303) that was split two or more counters (304, 305), the number of candidates y in SS set q in a second time duration (e.g., slot n or span n, and so on) as X2, where X2 is the third counter 305 defined by a positive value or zero.

The UE may count/assume using the first counter 303 that the number of linked candidate pairs is X, where X is a positive or zero value. X may be defined by the sum of the number of candidates in a SS set (e.g., the sum of the second counter and third counter X1+X2). Additionally or alternatively, X may be set to the number of candidates, defined by the second counter and third counter, in a search space (e.g., X=X1=X2). The present disclosure uses the above described example of the SS sets p and q, the candidates x and y, the slots m and n (e.g., time durations, spans, and so on), and the number X being defined by the sum of the number of linked PDCCH candidates counted.

Additionally or alternatively, the UE may determine a number of non-overlapped CCEs based on monitoring the PDCCH candidates. For example, the UE may use the number of non-overlapped CCEs determined while periodically monitoring the PDCCH candidates during the duration of time to determine whether the total number of non-overlapped CCEs monitored in the duration of time exceed a maximum number of non-overlapping CCEs. The number of non-overlapping CCEs counted/monitored may be zero, a positive value, an integer, or a decimal.

At 302, the UE may detect the relevant downlink information using the linked PDCCH candidates and the one or more counters, as described herein.

In some embodiments, the UE may report the X1 and X2 values based on the capability of the UE to the BS before of the PDCCH transmissions. Additionally or alternatively, the BS may provide the X1 and X2 values and not indicate X.

In some embodiments, the UE may report the X value based on the capability of the UE to the BS before the PDCCH transmission. In the event the UE is aware of the X only (e.g., not aware of X1 or X2), the UE may determine X1 and X2. For example, the UE may split X into X1 and X2 for each of the linked PDCCH candidates. Additionally or alternatively, the BS may indicate how to determine X1 and X2 based on X. In alternate embodiments, the BS may indicate the X value and/or the X1 and X2 value.

Figure 6:
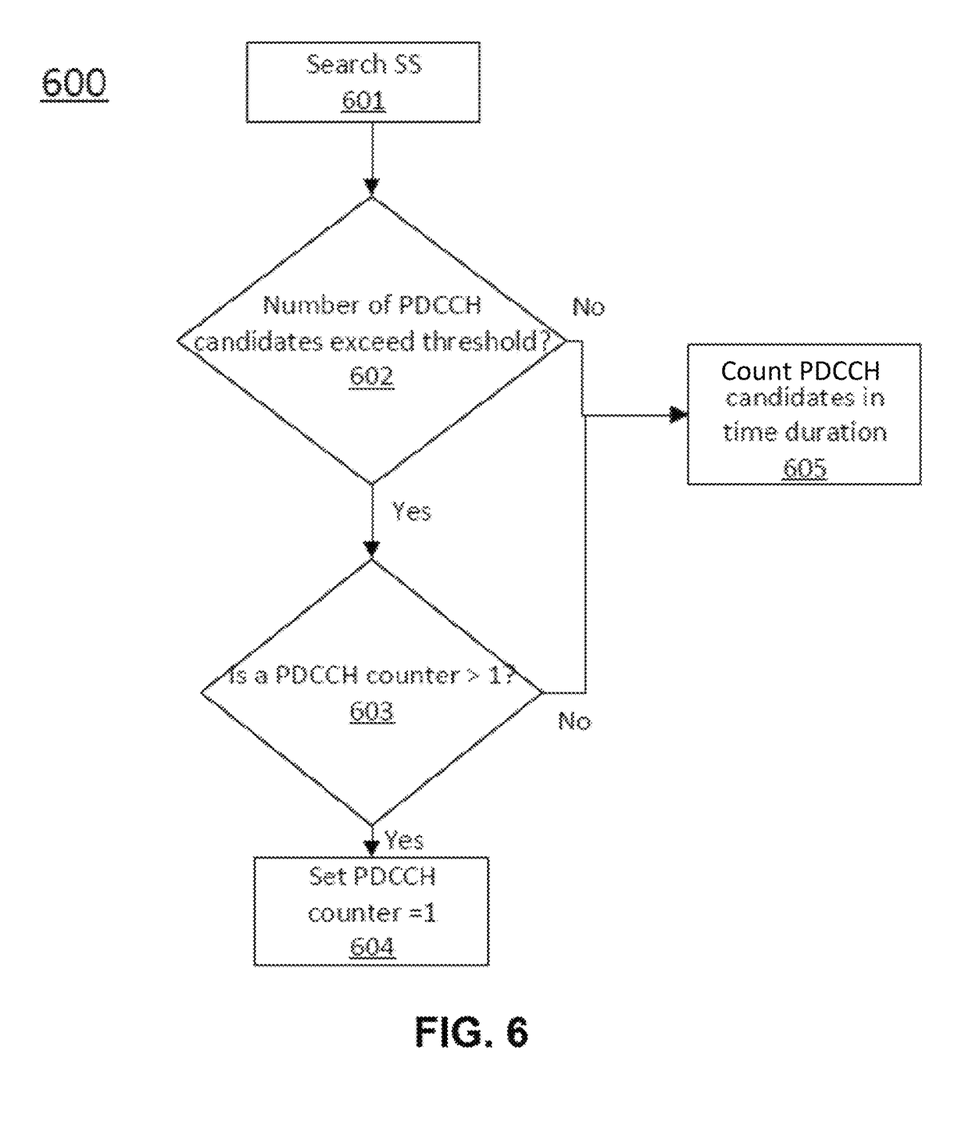
FIG. 6 illustrates an example method of the user equipment determining a counter value based on a number of PDCCH candidates, in accordance with some implementations of the present disclosure.

FIG. 6 illustrates an example method 600 of the user equipment determining a counter value based on a number of PDCCH candidates, in accordance with some implementations of the present disclosure.

At 601, the UE may search a SS. In decision 602, the UE may determine whether the number of PDCCH candidates exceed a threshold maximum number of PDCCH candidates limited to a time duration (e.g., slot m, span m, and so on). In the event that the number of PDCCH candidates do not exceed the threshold maximum number of PDCCH candidates limited to the time duration, the UE may continue counting the PDCCH candidates in the time duration at 605. In the event that the number of PDCCH candidates exceed the threshold maximum number of PDCCH candidates limited to the time duration, at 603, the UE may determine whether the number of PDCCH candidates counted exceeds a value (e.g., 1). In the event that the number of PDCCH candidates counted does not exceed a value, the UE may continue counting PDCCH candidates in the time duration at 605. In the event that the number of PDCCH candidates does exceed a threshold, the UE may set the PDCCH counter counting the associated PDCCH candidates to a value (e.g., 1) at 604. The UE may assume/count the number of candidates as 1 (e.g., candidate x is set to 1 instead of counted as X1). In the event the number of candidates still exceeds the threshold maximum number of PDCCH candidates limited to the first time duration (not shown), the UE may drop the SS set (e.g., SS set p) and the larger indexed search space set according to NR standards. In the event the UE drops the SS set, the UE may not monitor PDCCH candidates in the SS set.

In a SS set (e.g., SS set p), in the event the number of PDCCH candidates exceeds a threshold maximum number of PDCCH candidates limited to the first time duration (e.g., slot m, span m, and so on), the UE may not perform blind detection on SS set p in the second time duration (e.g., slot n, span n, and so on) and the UE may assume/count the number of candidates y in the associated/linked SS set q in the second time duration (e.g., slot n, span n, and so on) is set to 1 instead of X2.

In some examples, the UE may not monitor one of the linked candidates because the number of candidates may exceed the threshold maximum number of PDCCH candidates limited in the associated SS set in the time duration. In the event the UE does not monitor one of the linked PDCCH candidates, the UE may assume/count the number of another linked candidates in the other associated SS set as 1.

Additionally or alternatively, in a SS set (e.g., SS set p), in the event the UE doesn't receive the linked candidate in the associated SS set, the UE may assume/count the number of candidates y in the associated/linked SS set q in second time duration (e.g., slot n, span n, and so on) is set to 1 instead of X2.

Overbooking may occur when a number of counted monitored PDCCH candidates in a time duration exceeds a threshold maximum number of total PDCCH candidates in the time duration. The threshold maximum number of PDCCH candidates may be based on the capability of the UE.

The UE may determine a method of detecting linked PDCCH candidates based on an overbooking condition of the linked PDCCH candidates. In the event the UE uses a detection method resulting in a large counters/number of counted linked PDCCH candidates, causing overbooking, the UE may determine to use a detection method resulting in a smaller counters/number of linked PDCCH candidates, reducing the number of blind detections.

For example, given (1) two linked candidates, (2) and the UE (2a) decodes the individual PDCCH candidates, (2b) decodes the first PDCCH candidate and the combined candidate, or (2c) decodes each PDCCH candidate individually and also decodes the combined candidate, and (3) the UE detects that one of the SS sets is beyond the maximum threshold number of PDCCH candidates before the monitored time duration, then the UE may only decode the combined candidate without decoding the individual PDCCH candidates in the time duration. The time duration may include spans/slots in a same time duration, or spans/slots in different time durations.

Before a first linked time duration (e.g., slot, span, and so on), the UE may determine whether overbooking will happen on the first (earlier) linked time duration and a second (later) linked time duration. For example, in the event the number of PDCCH candidates to be monitored in the second linked time duration exceeds the threshold maximum number of PDCCH candidates per time duration, then the UE may assume that the number of the linked PDCCH candidates in the first time duration is 1. Additionally or alternatively, in the event the number of PDCCH candidates to be monitored in the earlier linked time duration exceeds the threshold maximum number of PDCCH candidates per time duration, then the UE may assume that the number of linked PDCCH candidates in the second time duration is 1.

Additionally or alternatively, in the event of overbooking, the UE may not drop a linked SS set. That is, the UE may prioritize a linked SS set containing linked PDCCH candidates when the UE monitors linked SS sets. For example, given linked SS sets 3 and 5, even if SS set 4 is overbooked, the UE may prioritize SS set 5 and perform blind detection instead of dropping SS set 5.

Based on the UE capabilities and a time relationship between the linked PDCCH candidates, the UE may use various methods to detect (e.g., using counters) a number of linked PDCCH candidates to determine downlink information. The UE may report the UE's methods of detecting linked PDCCH candidates based on the UE's capability to the BS in advanced. Additionally or alternatively, the BS may indicate to the UE how to detect the linked PDCCH candidates to determine the downlink information. The time relationship between the linked PDCCH candidates is determined based on whether a time duration (e.g., slot, span, and so on) of the linked PDCH candidates is the same, or whether the start symbols or end symbols of the MOs of the linked PDCCH candidates are the same.

The UE may select, based on the UE capabilities, one or more linked PDCCH candidate detection methods including: (1) the UE decoding only the combined candidate without decoding individual PDCCH candidates (2) the UE decodes individual PDCCH candidates (3) the UE decodes the first PDCCH candidate and the combined candidate (4) the UE decodes each PDCCH candidate individually, and also decodes the combined candidate.

For example, in the event that two linked PDCCH candidates are in the same time duration (e.g., the same slot, span, and so on), or the start/end symbol of the MO of the two linked PDCCH candidates are the same time domain, then the UE may detect linked PDCCH candidates by either (1) decoding the combined candidate without decoding individual PDCCH candidates, or (2) decoding each PDCCH candidate individually, and also decoding the combined candidate.

In the event that two linked PDCCH candidates are in different time durations (e.g., different slots, spans and so on), or the start/end symbol of the MO of the two linked PDCCH candidates are not in the same time domain, the UE may detect linked PDCCH candidates by either (1) decoding individual PDCCH candidates or (2) decoding the first PDCCH candidate and the combined candidate.

The UE may determine that a value of a counter (e.g., X1, X2, X) may be zero based on various time relationships. For instance, the UE may determine that the value of a counter is zero in response to determining the linked PDCCH candidates are in the same time duration (e.g., same slot, span), or that the linked PDCCH candidates have the same start/end symbol of the MOs.

In some embodiments, a SS set may be considered a reference set. The reference search space set may be the linked smaller indexed SS set, the linked larger indexed SS set, the SS set with the earlier detected/monitored linked PDCCH candidate, or the SS set with the later detected/monitored linked PDCCH candidate. The reference search space set may be configured with a variable length time duration (e.g., one slot (or span) or multiple slots (or spans)), but the linked PDCCH candidates are in the same time duration.

In the event that the UE assumes/counts that the number of linked PDCCH candidates in the reference search space set is X, the UE may assume/count the number of other linked candidates in a SS set other than the reference search space set as zero. Additionally or alternatively, in the event that the UE assumes/counts that the number of linked PDCCH candidates in the reference search space set is zero, the UE may assume/count the number of other linked candidates in another SS set (other than the reference SS set) as X.

For example, a reference search space set may be SS set 1 which is linked with SS set 2. Given a slot m, in the event SS1 is the reference SS set, the UE may count/assume the number of PDCCH candidates (e.g., candidates x) in SS set 1 is X, while the number of PDCCH candidates (e.g., candidates y) in SS set 2 is zero.

A PDCCH candidate may be considered a reference linked PDCCH candidate. The reference linked PDCCH candidate may be the linked PDCCH candidate with the smaller indexed SS set, the linked PDCCH candidate with the larger indexed SS set, the earlier detected/monitored linked PDCCH candidate, or the later detected/monitored PDCCH candidate. The reference linked PDCCH candidate may occur in one slot/span, or multiple slots/spans.

In the event that the UE assumes/counts, using a counter, that the number of reference PDCCH candidates is X, the UE may assume/count the number of other linked candidates is zero. Additionally or alternatively, in the event that the UE assumes/counts that the number of linked PDCCH candidates is zero, the UE may assume/count the number of other linked candidates is X. For example, given a slot m, with candidate x as the reference PDCCH candidate, the UE may count the number of candidates x as X instead of X1 and count the number of candidates y as 0.

Figure 4:
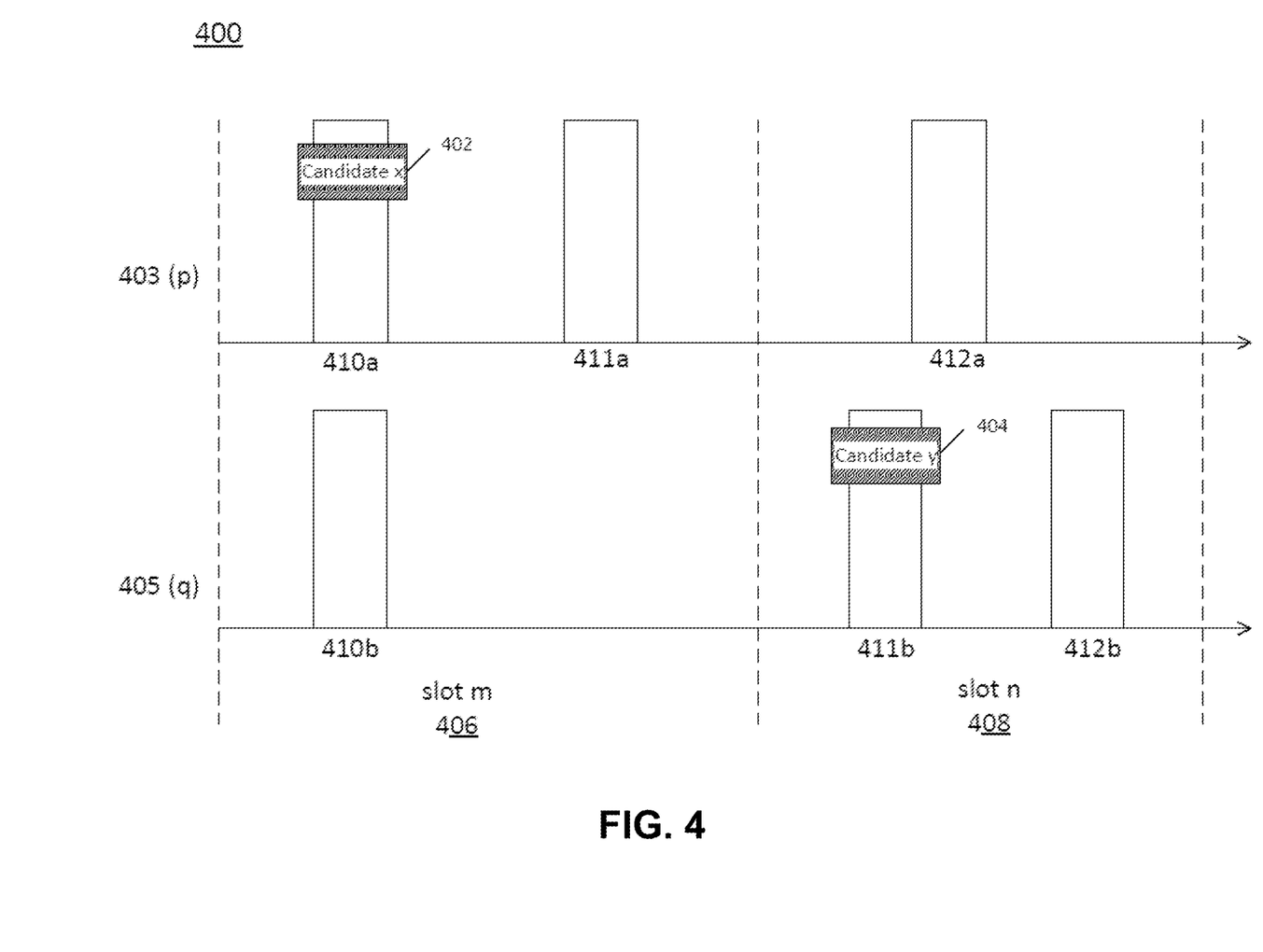
FIG. 4 illustrates a block diagram of PDCCH candidates with respect to their search spaces and slots, in accordance with some implementations of the present disclosure.

FIG. 4 illustrates a block diagram 400 of PDCCH candidates with respect to their search spaces and slots, in accordance with some implementations of the present disclosure. As shown, candidate x (402) and candidate y (404) are detected by the UE in different slots. The UE may detect various monitoring occurrences (e.g., 410-412) in each slot and each SS. For example, slot m (406) in the SS set p (403) contains two monitoring events, 410a and 411a. Candidate x (402) is detected in slot m (406) in monitoring event 410a. In the SS set q (405) of slot m (306), there is one monitoring event 410b.

In the SS set p (403) in slot n (408), there is one monitoring event 412a. In the SS set q (405) in slot n (408), there are two monitoring events, 411b and 412b. Candidate y (404) is detected in the search space q (405) of slot n (408) in the first monitoring event 411b.

Figure 5:
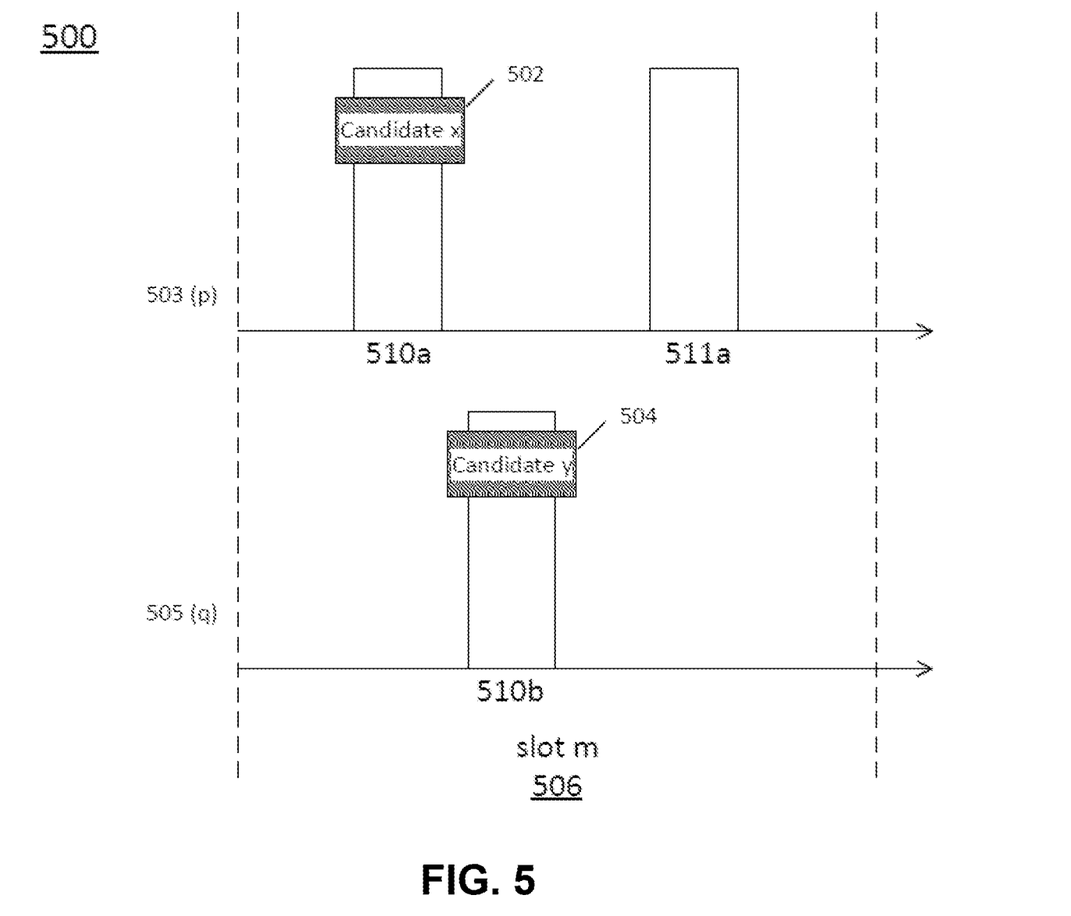
FIG. 5 illustrates a block diagram of PDCCH candidates with respect to their search spaces and slots, in accordance with some implementations of the present disclosure.

FIG. 5 illustrates a block diagram 500 of PDCCH candidates with respect to their search spaces and slots, in accordance with some implementations of the present disclosure. In contrast to FIG. 4, where the PDCCH candidates were in different slots (e.g., slot m and slot n), in FIG. 5, candidate x (502) and candidate y (504) are in the same slot m (506). That is, slot m (506) is equal to slot n (not shown). However, the PDCCH candidates x (502) and y (504) are in different SS set. Candidate x (502) is in the first monitoring event 410a in SS set p (503), and candidate y (504) in the first monitoring event 510b is in SS set q (505).

In the event UE decodes individual PDCCH candidates, X may be any value and X1=X2=X/2.

As shown in Tables 1A-1F, in the event the UE decodes the combined candidate (X) without decoding the individual PDCCH candidates (e.g., the UE is not aware of X1 and X2), then the UE may determine X1 and X2 based on the value of X.

In an example in which (1) the value of X is defined using the expression: $1 \leq X \leq 2$, and (2) the UE counts/assumes that the number of associated/linked candidates detected earlier is equal to or less than the number of associated/linked candidates detected later, then the UE's determination of X1 and X2 may be determined as shown in Table 1A. In this case, (3) in different time durations where (4a) m is less than n, then the value of X1 is defined using the expression $0 \leq X1 \leq 1$, and X2 is defined using the expression $0 \leq X2 \leq 1$, where $X2 \geq X1$. In the case that (4b) m is larger than n, then the value of X2 is defined using the expression $0 \leq X2 \leq 1$, and X1 is defined using the expression $0 \leq X1 \leq 1$, where $X1 \geq X2$.

TABLE 1A

UE decodes combined candidate without decoding individual PDCCH
candidates and range of X is between $1 \leq X \leq 2$,
where the number of linked candidates detected earlier is
equal to or less than the number of linked candidates detected later

| Different Slots | X1 Range | X2 Range | Condition |
|---|---|---|---|
| m < n | $0 \leq X1 \leq 1$ | $0 \leq X2 \leq 1$ | $X2 \geq X1$ |
| m > n | $0 \leq X1 \leq 1$ | $0 \leq X2 \leq 1$ | $X1 \geq X2$ |

In an example in which (1) the value of X is defined using the expression: $1 \leq X \leq 2$, and (2) the UE counts/assumes that the number of associated/linked candidates detected later is equal to or less than the number of associated/linked candidates detected earlier, then the UE's determination of X1 and X2 may be determined as shown in Table 1B. In this case, (3) in different time durations where (4a) m is larger than n, then the value of X1 is defined using the expression $0 \leq X1 \leq 1$, and X2 is defined using the expression $0 \leq X2 \leq 1$, where $X1 \geq X2$. In the case that (4b) m is smaller than n, then the value of X2 is defined using the expression $0 \leq X2 \leq 1$, and X1 is defined using the expression $0 \leq X1 \leq 1$, where $X2 \geq X1$.

TABLE 1B

UE decodes combined Candidate without decoding individual PDCCH
candidates and range of X is between $1 \leq X \leq 2$, where
the number of linked candidates detected later is equal to
or less than the number of linked candidates detected earlier

| Different Slots | X1 Range | X2 Range | Condition |
|---|---|---|---|
| m < n | $0 \leq X1 \leq 1$ | $0 \leq X2 \leq 1$ | $X1 \geq X2$ |
| m > n | $0 \leq X1 \leq 1$ | $0 \leq X2 \leq 1$ | $X2 \geq X1$ |

Additionally or alternatively, in an example in which (1) the value of X is defined using the expression $1 \leq X \leq 2$, and (2) the UE counts/assumes that the number of associated/linked candidates detected earlier is equal to or less than the number of associated/linked candidates detected later, then the UE's determination of X1 and X2 may be determined as shown in Table 1C. In this case, (3) in the same time durations n=m, and (4a) candidate x is the earlier linked candidate and candidate y is the later detected candidate, then the value of X1 is defined using the expression $0 \leq X1 \leq 1$, and X2 is defined using the expression $0 \leq X2 \leq 1$, where $X2 \geq X1$. In the case that (4b) candidate y is the earlier detected candidate and candidate x is the later detected candidate, then the value of X1 is defined using the expression $0 \leq X1 \leq 1$, and X2 is defined using the expression $0 \leq X2 \leq 1$, where $X1 \geq X2$.

TABLE 1C

UE decodes combined candidate without decoding individual PDCCH
candidates and range of X is between $1 \leq X \leq 2$, where
the number of linked candidates detected earlier is equal to
or less than the number of linked candidates detected later

| Detected Candidate | X1 Range | X2 Range | Condition |
|---|---|---|---|
| x is detected first, y is detected second | $0 \leq X1 \leq 1$ | $0 \leq X2 \leq 1$ | $X2 \geq X1$ |
| y is detected first, x is detected second | $0 \leq X1 \leq 1$ | $0 \leq X2 \leq 1$ | $X1 \geq X2$ |

Additionally or alternatively, in an example in which (1) the value of X is defined using the expression $1 \leq X \leq 2$, and (2) the UE counts/assumes that the number of associated/linked candidates detected later is equal to or less than the number of associated/linked candidates detected earlier, then the UE's determination of X1 and X2 may be determined as shown in Table 1D. In this case, (3) in the same time durations n=m, and (4a) candidate x is the earlier detected linked candidate and candidate y is the later detected linked candidate, then the value of X1 is defined using the expression $0 \leq X1 \leq 1$, and X2 is defined using the expression $0 \leq X2 \leq 1$, where $X1 \geq X2$. In the case that (4b) candidate y is the earlier detected candidate and candidate x is the later detected candidate, then the value of X1 is defined using the expression $0 \leq X1 \leq 1$, and X2 is defined using the expression $0 \leq X2 \leq 1$, where $X2 \geq X1$.

TABLE 1D

UE decodes combined candidate without decoding individual PDCCH
candidates and range of X is between $1 \leq X \leq 2$, where
the number of linked candidates detected later is equal to
or less than the number of linked candidates detected earlier

| Detected Candidate | X1 Range | X2 Range | Condition |
|---|---|---|---|
| x is detected first, y is detected second | $0 \leq X1 \leq 1$ | $0 \leq X2 \leq 1$ | $X1 \geq X2$ |
| y is detected first, x is detected second | $0 \leq X1 \leq 1$ | $0 \leq X2 \leq 1$ | $X2 \geq X1$ |

Additionally or alternatively, in an example in which (1) the value of X is defined using the expression $1 \leq X \leq 2$, and (2) the UE counts/assumes that the number of associated/linked candidates with the smaller SS set index to be equal to or less than the number of associated/linked candidates with the larger SS set index, then the UE's determination of X1 and X2 may be determined as shown in Table 1E. In this case, (3) in the same time durations m=n, and (4a) p is less than q, then the value of X1 is defined using the expression $0 \leq X1 \leq 1$, and X2 is defined using the expression $0 \leq X2 \leq 1$, where $X2 \geq X1$. In the case that (4b) p is greater than q, then the value of X1 is defined using the expression $0 \leq X1 \leq 1$, and X2 is defined using the expression $0 \leq X2 \leq 1$, where $X1 \geq X2$.

TABLE 1E

UE decodes combined candidate without decoding individual
PDCCH candidates and range of X is between $1 \leq X \leq 2$, where the number of linked candidates with the
smaller search space index is equal to or less than the
number of linked candidates with the larger search space index

| Search Space | X1 Range | X2 Range | Condition |
|---|---|---|---|
| p < q | $0 \leq X1 \leq 1$ | $0 \leq X2 \leq 1$ | $X2 \geq X1$ |
| p > q | $0 \leq X1 \leq 1$ | $0 \leq X2 \leq 1$ | $X1 \geq X2$ |

Additionally or alternatively, in an example in which (1) the value of X is defined using the expression $1 \leq X \leq 2$, and (2) the UE counts/assumes that the number of associated/linked candidates with the larger SS set index to be equal to or less than the number of associated/linked candidates with the smaller SS set index, then the UE's determination of X1 and X2 may be determined as shown in Table 1F. In this case, (3) in the same time durations m=n, and (4a) p is less than q, then the value of X1 is defined using the expression $0 \leq X1 \leq 1$, and X2 is defined using the expression $0 \leq X2 \leq 1$, where $X1 \geq X2$. In the case that (4b) p is greater than q, then the value of X1 is defined using the expression $0 \leq X1 \leq 1$, and X2 is defined using the expression $0 \leq X2 \leq 1$, where $X2 \geq X1$.

TABLE 1F

UE decodes combined candidate without decoding individual PDCCH candidates and range of X is between $1 \leq X \leq 2$, where the number of linked candidates with the larger search space index is equal to or less than the number of linked candidates with the smaller search space index

| Search Space | X1 Range | X2 Range | Condition |
|---|---|---|---|
| p < q | 0 ≤ X1 ≤ 1 | 0 ≤ X2 ≤ 1 | X1 ≥ X2 |
| p > q | 0 ≤ X1 ≤ 1 | 0 ≤ X2 ≤ 1 | X2 ≥ X1 |

As shown in Tables 2A-2F, in the event the UE decodes the combined candidate (X) and decode both the PDCCH candidates individually, then the UE may determine X1 and X2 based on the value of X.

In an example in which (1) the value of X is defined using the expression: $2 \leq X \leq 4$, and (2) the UE counts/assumes that the number of associated/linked candidates detected earlier is equal to or less than the number of associated/linked candidates detected later, then the UE's determination of X1 and X2 may be determined as shown in Table 2A. In this case, (3) in different time durations where (4a) m is less than n, then the value of X1 is defined using the expression $1 \leq X1 \leq 2$, and X2 is defined using the expression $1 \leq X2 \leq 2$, where $X2 \geq X1$. In the case that (4b) m is larger than n, then the value of X2 is defined using the expression $1 \leq X2 \leq 2$, and X1 is defined using the expression $1 \leq X1 \leq 2$, where $X1 \geq X2$.

TABLE 2A

UE decodes the combined candidate and both the PDCCH candidates individually and range of X is between $2 \leq X \leq 4$, where the number of linked candidates detected earlier is equal to or less than the number of linked candidates detected later

| Different Slots | X1 Range | X2 Range | Condition |
|---|---|---|---|
| m < n | 1 ≤ X1 ≤ 2 | 1 ≤ X2 ≤ 2 | X2 ≥ X1 |
| m > n | 1 ≤ X1 ≤ 2 | 1 ≤ X2 ≤ 2 | X1 ≥ X2 |

In an example in which (1) the value of X is defined using the expression: $2 \leq X \leq 4$, and (2) the UE counts/assumes that the number of associated/linked candidates detected later is equal to or less than the number of associated/linked candidates detected earlier, then the UE's determination of X1 and X2 may be determined as shown in Table 2B. In this case, (3) in different time durations where (4a) m is larger than n, then the value of X1 is defined using the expression $1 \leq X1 \leq 2$, and X2 is defined using the expression $1 \leq X2 \leq 2$, where $X2 \geq X1$. In the case that (4b) m is smaller than n, then the value of X2 is defined using the expression $1 \leq X2 \leq 2$, and X1 is defined using the expression $1 \leq X1 \leq 2$, where $X1 \geq X2$.

TABLE 2B

UE decodes combined candidate and both the PDCCH candidates individually and range of X is between $2 \leq X < 4$, where the number of linked candidates detected later is equal to or less than the number of linked candidates detected earlier

| Different Slots | X1 Range | X2 Range | Condition |
|---|---|---|---|
| m < n | 1 ≤ X1 ≤ 2 | 1 ≤ X2 ≤ 2 | X1 ≥ X2 |
| m > n | 1 ≤ X1 ≤ 2 | 1 ≤ X2 ≤ 2 | X2 ≥ X1 |

Additionally or alternatively, in an example in which (1) the value of X is defined using the expression $2 \leq X \leq 4$, and (2) the UE counts/assumes that the number of associated/linked candidates detected earlier is equal to or less than the number of associated/linked candidates detected later, then the UE's determination of X1 and X2 may be determined as shown in Table 2C. In this case, (3) in the same time durations n=m, and (4a) candidate x is the earlier detected candidate and candidate y is the later detected candidate, then the value of X1 is defined using the expression $1 \leq X1 \leq 2$, and X2 is defined using the expression $1 \leq X2 \leq 2$, where $X2 \geq X1$. In the case that (4b) candidate y is the earlier detected candidate and candidate x is the later detected candidate, then the value of X1 is defined using the expression $1 \leq X1 \leq 2$, and X2 is defined using the expression $1 \leq X2 \leq 2$, where $X1 \geq X2$.

TABLE 2C

UE decodes combined candidate and both the PDCCH candidates individually and range of X is between $2 \leq X \leq 4$, where the number of linked candidates detected earlier is equal to or less than the number of linked candidates detected later

| Detected Candidate | X1 Range | X2 Range | Condition |
|---|---|---|---|
| x is detected first, y is detected second | 1 ≤ X1 ≤ 2 | 1 ≤ X2 ≤ 2 | X2 ≥ X1 |
| y is detected first, x is detected second | 1 ≤ X1 ≤ 2 | 1 ≤ X2 ≤ 2 | X1 ≥ X2 |

Additionally or alternatively, in an example in which (1) the value of X is defined using the expression $2 \leq X \leq 4$, and (2) the UE counts/assumes that the number of associated/linked candidates detected later is equal to or less than the number of associated/linked candidates detected earlier, then the UE's determination of X1 and X2 may be determined as shown in Table 2D. In this case, (3) in the same time durations n=m, and (4a) candidate x is the earlier detected linked candidate and candidate y is the later detected linked candidate, then the value of X1 is defined using the expression $1 \leq X1 \leq 2$, and X2 is defined using the expression $1 \leq X2 \leq 2$, where $X1 \geq X2$. In the case that (4b) candidate y is the earlier detected candidate and candidate x is the later detected candidate, then the value of X1 is defined using the expression $1 \leq X1 \leq 2$, and X2 is defined using the expression $1 \leq X2 \leq 2$, where $X2 \geq X1$.

TABLE 2D

UE decodes combined candidate and both the PDCCH candidates
individually and range of X is between 2 ≤ X ≤ 4,
where the number of linked candidates detected later is equal
to or less than the number of linked candidates detected earlier

| Detected Candidate | X1 Range | X2 Range | Condition |
|---|---|---|---|
| x is detected first, y is detected second | 1 ≤ X1 ≤ 2 | 1 ≤ X2 ≤ 2 | X1 ≥ X2 |
| y is detected first, x is detected second | 1 ≤ X1 ≤ 2 | 1 ≤ X2 ≤ 2 | X2 ≥ X1 |

Additionally or alternatively, in an example in which (1) the value of X is defined using the expression 2≤X≤4, and (2) the UE counts/assumes that the number of associated/linked candidates with the smaller SS set index to be equal to or less than the number of associated/linked candidates with the larger SS set index, then the UE's determination of X1 and X2 may be determined as shown in Table 2E. In this case, (3) in the same time durations m=n, and (4a) p is less than q, then the value of X1 is defined using the expression 1≤X1≤2, and X2 is defined using the expression 1≤X2≤2, where X2≥X1. In the case that (4b) p is greater than q, then the value of X1 is defined using the expression 1≤X1≤2, and X2 is defined using the expression 1≤X2≤2, where X1≥X2.

TABLE 2E

UE decodes combined candidate and both the PDCCH candidates
individually and range of X is between 2 ≤ X ≤
4, where the number of linked candidates with the smaller
search space set index is equal to or less than the number
of linked candidates with the larger search space set index

| Search Space | X1 Range | X2 Range | Condition |
|---|---|---|---|
| p < q | 1 ≤ X1 ≤ 2 | 1 ≤ X2 ≤ 2 | X2 ≥ X1 |
| p > q | 1 ≤ X1 ≤ 2 | 1 ≤ X2 ≤ 2 | X1 ≥ X2 |

Additionally or alternatively, in an example in which (1) the value of X is defined using the expression 2≤X≤4, and (2) the UE counts/assumes that the number of associated/linked candidates with the larger SS set index to be equal to or less than the number of associated/linked candidates with the smaller SS set index, then the UE's determination of X1 and X2 may be determined as shown in Table 2F. In this case, (3) in the same time durations m=n, and (4a) p is less than q, then the value of X1 is defined using the expression 1≤X1≤2, and X2 is defined using the expression 1≤X2≤2, where X1≥X2. In the case that (4b) p is greater than q, then the value of X1 is defined using the expression 1≤X1≤2, and X2 is defined using the expression 1≤X2≤2, where X2≥X1.

TABLE 2F

UE decodes combined candidate and both the PDCCH candidates
individually and range of X is between 2 ≤ X ≤
4, where the number of linked candidates with the larger
search space set index is equal to or less than the number
of linked candidates with the smaller search space set index

| Search Space | X1 Range | X2 Range | Condition |
|---|---|---|---|
| p < q | 1 ≤ X1 ≤ 2 | 1 ≤ X2 ≤ 2 | X1 ≥ X2 |
| p > q | 1 ≤ X1 ≤ 2 | 1 ≤ X2 ≤ 2 | X2 ≥ X1 |

As shown in Tables 3A-3F, in the event the UE decodes the first PDCCH candidate and the combined candidate, then the UE may determine the other PDCCH candidate based on the first PDCCH candidate and the combined candidate.

In an example in which (1) the value of X is defined using the expression: 2≤X≤3, and (2) the UE counts/assumes that the number of associated/linked candidates detected earlier is equal to or less than the number of associated/linked candidates detected later, then the UE's determination of X1 and X2 may be determined as shown in Table 3A. In this case, (3) in different time durations where (4a) m is less than n, then the value of X1 is defined using the expression 0≤X1≤1, and X2 is defined using the expression 0≤X2≤1, where X2≥X1. In the case that (4b) m is larger than n, then the value of X2 is defined using the expression 0≤X2≤1, and X1 is defined using the expression 0≤X1≤1, where X1≥X2.

TABLE 3A

UE decodes the first PDCCH candidate and the combined candidate
and range of X is between 2 ≤ X ≤ 3, where the
number of linked candidates detected earlier is equal to
or less than the number of linked candidates detected later

| Different Slots | X1 Range | X2 Range | Condition |
|---|---|---|---|
| m < n | 0 ≤ X1 ≤ 1 | 0 ≤ X2 ≤ 1 | X2 ≥ X1 |
| m > n | 0 ≤ X1 ≤ 1 | 0 ≤ X2 ≤ 1 | X1 ≥ X2 |

In an example in which (1) the value of X is defined using the expression: 2≤X≤3, and (2) the UE counts/assumes that the number of associated/linked candidates detected later is equal to or less than the number of associated/linked candidates detected earlier, then the UE's determination of X1 and X2 may be determined as shown in Table 3B. In this case, (3) in different time durations where (4a) m is larger than n, then the value of X1 is defined using the expression 0≤X1≤1, and X2 is defined using the expression 0≤X2≤1, where X2≥X1. In the case that (4b) m is smaller than n, then the value of X2 is defined using the expression 0≤X2≤1, and X1 is defined using the expression 0≤X1≤1, where X1≥X2.

TABLE 3B

UE decodes the first PDCCH candidate and the combined candidate
and range of X is between 2 ≤ X ≤ 3, where the
number of linked candidates detected later is equal to
or less than the number of linked candidates detected earlier

| Different Slots | X1 Range | X2 Range | Condition |
|---|---|---|---|
| m < n | 0 ≤ X1 ≤ 1 | 0 ≤ X2 ≤ 1 | X1 ≥ X2 |
| m > n | 0 ≤ X1 ≤ 1 | 0 ≤ X2 ≤ 1 | X2 ≥ X1 |

Additionally or alternatively, in an example in which (1) the value of X is defined using the expression 2≤X≤3, and (2) the UE counts/assumes that the number of associated/linked candidates detected earlier is equal to or less than the number of associated/linked candidates detected later, then the UE's determination of X1 and X2 may be determined as shown in Table 3C. In this case, (3) in the same time durations n=m, and (4a) candidate x is the earlier linked candidate and candidate y is the later detected candidate, then the value of X1 is defined using the expression 0≤X1≤1, and X2 is defined using the expression 0≤X2≤1, where X2≥X1. In the case that (4b) candidate y is the earlier detected candidate and candidate x is the later detected candidate, then the value of X1 is defined using the expression 0≤X1≤1, and X2 is defined using the expression 0≤X2≤1, where X1≥X2.

TABLE 3C

UE decodes the first PDCCH candidate and the combined candidate and range of X is between 2 ≤ X ≤ 3, where the number of linked candidates detected earlier is equal to or less than the number of linked candidates detected later

| Detected | X1 Range | X2 Range | Condition |
|---|---|---|---|
| Candidate x is detected first, y is detected second | 0 ≤ X1 ≤ 1 | 0 ≤ X2 ≤ 1 | X2 ≥ X1 |
| y is detected first, x is detected second | 0 ≤ X1 ≤ 1 | 0 ≤ X2 ≤ 1 | X1 > X2 |

Additionally or alternatively, in an example in which (1) the value of X is defined using the expression 2≤X≤3, and (2) the UE counts/assumes that the number of associated/linked candidates detected later is equal to or less than the number of associated/linked candidates detected earlier, then the UE's determination of X1 and X2 may be determined as shown in Table 3D. In this case, (3) in the same time durations n=m, and (4a) candidate x is the earlier detected linked candidate and candidate y is the later detected linked candidate, then the value of X1 is defined using the expression 0≤X1≤1, and X2 is defined using the expression 0≤X2≤1, where X1≥X2. In the case that (4b) candidate y is the earlier detected candidate and candidate x is the later detected candidate, then the value of X1 is defined using the expression 0≤X1≤1, and X2 is defined using the expression 0≤X2≤1, where X2≥X1.

TABLE 3D

UE decodes combined candidate without decoding individual PDCCH candidates and range of X is between 2 ≤ X ≤ 3, where the number of linked candidates detected later is equal to or less than the number of linked candidates detected earlier

| Detected | X1 Range | X2 Range | Condition |
|---|---|---|---|
| Candidate x is detected first, y is detected second | 0 ≤ X1 ≤ 1 | 0 ≤ X2 ≤ 1 | X1 ≥ X2 |
| y is detected first, x is detected second | 0 ≤ X1 ≤ 1 | 0 ≤ X2 ≤ 1 | X2 ≥ X1 |

Additionally or alternatively, in an example in which (1) the value of X is defined using the expression 2≤X≤3, and (2) the UE counts/assumes that the number of associated/linked candidates with the smaller SS set index to be equal to or less than the number of associated/linked candidates with the larger SS set index, then the UE's determination of X1 and X2 may be determined as shown in Table 3E. In this case, (3) in the same time durations m=n, and (4a) p is less than q, then the value of X1 is defined using the expression 0≤X1≤1, and X2 is defined using the expression 0≤X2≤1, where X2≥X1. In the case that (4b) p is greater than q, then the value of X1 is defined using the expression 0≤X1≤1, and X2 is defined using the expression 0≤X2≤1, where X1≥X2.

TABLE 3E

UE decodes the first PDCCH candidate and the combined candidate and range of X is between 2 ≤ X ≤ 3, where the number of linked candidates with the smaller search space index is equal to or less than the number of linked candidates with the larger search space index

| Search Space | X1 Range | X2 Range | Condition |
|---|---|---|---|
| p < q | 0 ≤ X1 ≤ 1 | 0 ≤ X2 ≤ 1 | X2 ≥ X1 |
| p > q | 0 ≤ X1 ≤ 1 | 0 ≤ X2 ≤ 1 | X1 ≥ X2 |

Additionally or alternatively, in an example in which (1) the value of X is defined using the expression 2≤X≤3, and (2) the UE counts/assumes that the number of associated/linked candidates with the larger SS set index to be equal to or less than the number of associated/linked candidates with the smaller SS set index, then the UE's determination of X1 and X2 may be determined as shown in Table 3F. In this case, (3) in the same time durations m=n, and (4a) p is less than q, then the value of X1 is defined using the expression 0≤X1≤1, and X2 is defined using the expression 0≤X2≤1, where X1≥X2. In the case that (4b) p is greater than q, then the value of X1 is defined using the expression 0≤X1≤1, and X2 is defined using the expression 0≤X2≤1, where X2≥X1.

TABLE 3F

UE decodes the first PDCCH candidate and the combined candidate and range of X is between 2 ≤ X ≤ 3, where the number of linked candidates with the larger search space index is equal to or less than the number of linked candidates with the smaller search space index

| Search Space | X1 Range | X2 Range | Condition |
|---|---|---|---|
| p < q | 0 ≤ X1 ≤ 1 | 0 ≤ X2 ≤ 1 | X1 ≥ X2 |
| p > q | 0 ≤ X1 ≤ 1 | 0 ≤ X2 ≤ 1 | X2 ≥ X1 |

In some examples, wireless communication method implemented by the network (one or more base stations) includes transmitting, by a base station to the UE, downlink information. The UE determines one or more counters for a plurality of linked PDCCH candidates. The plurality of linked PDCCH candidates are linked. The one or more counters are numbers of linked PDCCH candidate to be monitored. Each of the one or more counters is an integer or a decimal. The one or more counters are counted as a same number or different numbers. The base station sends the downlink information using the plurality of linked PDCCH candidates. The method further includes transmitting, by the base station to the wireless communication device, downlink data according to the scheduling information.

While various implementations of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one implementation can be combined with one or more features of another implementation described herein. Thus, the breadth and scope of the present disclosure should not be limited by any of the above-described illustrative implementations.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according implementations of the present solution.

Additionally, memory or other storage, as well as communication components, may be employed in implementations of the present solution. It will be appreciated that, for clarity purposes, the above description has described implementations of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
 determining, by a wireless communication device, a first counter and a second counter for a pair of linked Physical Downlink Control Channel (PDCCH) candidates, comprising:
  determining, by the wireless communication device, a first counter value X1 of the first counter corresponding to a first linked PDCCH candidate of the pair of linked PDCCH candidates; and
  determining, by the wireless communication device, a second counter value X2 of the second counter corresponding to a second linked PDCCH candidate of the pair of linked PDCCH candidates, wherein X1 is 1 and X2 is 2, wherein downlink control information (DCI) transmissions detected in the pair of PDCCH candidates carry same control information, and wherein a value of each of the first counter or the second counter represents a number of the linked PDCCH candidates for PDCCH monitoring, and is an integer value; and
 detecting, by the wireless communication device, downlink information using the pair of linked PDCCH candidates, the first counter, and the second counter.

2. The wireless communication method of claim 1, further comprising:
  detecting, by the wireless communication device, the first linked PDCCH candidate and the second linked PDCCH candidate, wherein the first linked PDCCH candidate is an earlier linked PDCCH candidate of the pair of linked PDCCH candidates, the second linked PDCCH candidate is a later linked PDCCH candidate of the pair of linked PDCCH candidates, and the earlier linked PDCCH candidate is detected before the later linked PDCCH candidate.

3. The wireless communication method of claim 1, further comprising:
  reporting, by the wireless device, a value of the first counter and the second counter.

4. The wireless communication method of claim 1, wherein the first linked PDCCH candidate is associated with a first search space set and the second linked PDCCH candidate is associated with a second search space set.

5. A wireless communication device, comprising:
  at least one processor configured to:
    determine a first counter and a second counter for a pair of linked Physical Downlink Control Channel (PDCCH) candidates, comprising:
      determining, by the wireless communication device, a first counter value X1 of the first counter corresponding to a first linked PDCCH candidate of the pair of linked PDCCH candidates; and
      determining, by the wireless communication device, a second counter value X2 of the second counter corresponding to a second linked PDCCH candidate of the pair of linked PDCCH candidates, wherein X1 is 1 and X2 is 2, wherein downlink control information (DCI) transmissions detected in the pair of PDCCH candidates carry same control information, and wherein a value of each of the first counter or the second counter represents a number of the linked PDCCH candidates for PDCCH monitoring, and is an integer value; and
    detecting, by the wireless communication device, downlink information using the pair of linked PDCCH candidates, the first counter, and the second counter.

6. The wireless communication device of claim 5, wherein the at least one processor is further configured to:
  detect the first linked PDCCH candidate and the second linked PDCCH candidate, wherein the first linked PDCCH candidate is an earlier linked PDCCH candidate of the pair of linked PDCCH candidates, the second linked PDCCH candidate is a later linked PDCCH candidate of the pair of linked PDCCH candidates, and the earlier linked PDCCH candidate is detected before the later linked PDCCH candidate.

7. The wireless communication device of claim 5, wherein the at least one processor is further configured to report a value of the first counter and the second counter.

8. The wireless communication device of claim 5, wherein the first linked PDCCH candidate is associated with a first search space set and the second linked PDCCH candidate is associated with a second search space set.

* * * * *